United States Patent [19]

Barker

[11] Patent Number: 4,611,161
[45] Date of Patent: Sep. 9, 1986

[54] RECHARGEABLE BATTERY SYSTEM
[76] Inventor: Peter F. Barker, 13 Maze Hill, St. Leonards on Sea, East Sussex TN38 OBA, United Kingdom
[21] Appl. No.: 464,497
[22] PCT Filed: Jun. 1, 1982
[86] PCT No.: PCT/GB82/00162
§ 371 Date: Jan. 28, 1983
§ 102(e) Date: Jan. 28, 1983
[87] PCT Pub. No.: WO82/04355
PCT Pub. Date: Dec. 9, 1982
[30] Foreign Application Priority Data
May 29, 1981 [GB] United Kingdom ............... 8116547
[51] Int. Cl.⁴ ............................................. H02J 7/00
[52] U.S. Cl. ........................................ 320/2; 320/56; 320/57
[58] Field of Search ......................... 320/2-4, 320/39, 40, 56; 307/149, 150

[56] References Cited
U.S. PATENT DOCUMENTS 2,867,039 1/1959 Zach ................................. 320/56 X
3,013,198 12/1961 Witte et al. .
3,028,536 4/1962 Bilsky ................................. 320/2
3,109,120 10/1963 Scarpelli .
3,109,132 10/1963 Witte .................................. 320/2 X
3,277,358 10/1966 Nicholl ............................... 320/2 X
3,281,637 10/1966 Hultquist ............................ 320/2
3,413,537 11/1968 Sharp et al. ....................... 320/27
3,521,050 7/1970 Shagena, Jr. .
3,735,233 5/1973 Ringle ............................... 320/39 X
3,963,972 6/1976 Todd ................................. 320/2
4,086,523 5/1978 Izumi .

FOREIGN PATENT DOCUMENTS 1513336 12/1969 Fed. Rep. of Germany .
2246101 4/1975 France .
1120440 7/1968 United Kingdom .

Primary Examiner—R. J. Hickey
Attorney, Agent, or Firm—Stevens, Davis, Miller & Mosher

[57] ABSTRACT

A rechargeable battery comprises a casing (1) intended to fit into the space occupied by one or more dry batteries, the casing (1) containing one or more nickel cadmium cells (6), a charging unit (8) for the cells (6) and means (11) for connecting the charging unit (8) to a supply of electricity.

12 Claims, 5 Drawing Figures

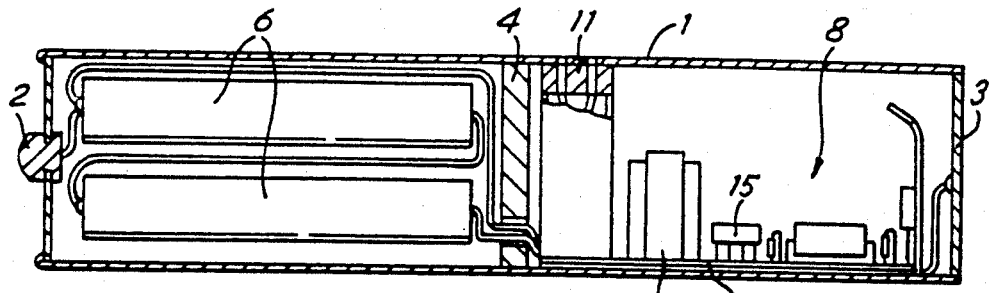
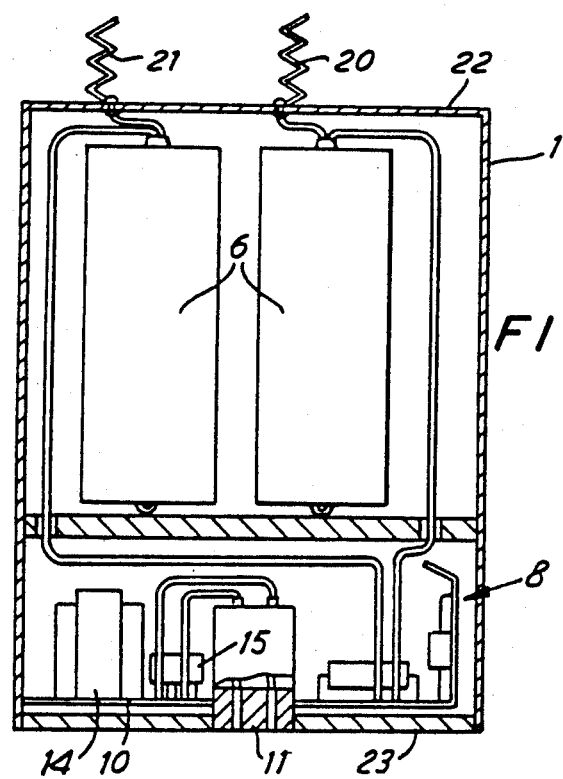
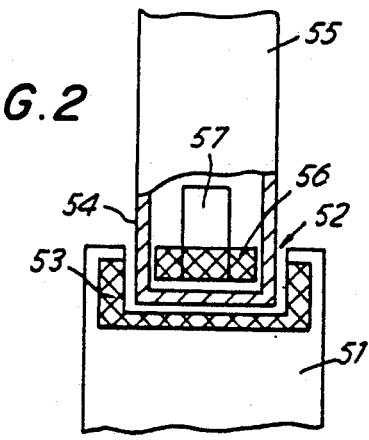

RECHARGEABLE BATTERY SYSTEM

This invention relates to a rechargeable battery system.

There are a large number of applications today in which dry cells are used. Such applications include lanterns and torches, various transistorised apparatus such as radios, cassette recorders, radio-controlled models.

One of the major problems existing with dry batteries is the fact that they have a short life and are relatively expensive to replace, particularly at short regular intervals. Another disadvantage of the dry cell resides in its use in apparatus which are not operated regularly but are merely used for standby purposes. With these the problem resides in the fact that when a dry cell gets old, there is a significant tendency for it to leak, thus not only making a nasty mess, but also causing significant destruction to the apparatus in which it is situated.

One proposal for getting round both these problems is the replacement of dry batteries by nickel cadmium cells of similar capacity. These cells are rechargeable and thus do not require to be replaced when they become discharged. As a result, the cells have a particularly long life, and are not subject, due to their different construction, to the leaking of dangerous chemicals as they age. However, such replacements are not entirely satisfactory since, if they are to be used as straight dry battery replacements, they require to be removed and individually recharged in an exterior charger provided for this purpose. Particularly, where a number of cells are required, this increases substantially the time necessary to recharge the batteries and the time in which the particular piece of apparatus is nonoperational. The provision of individual battery charges is expensive and, if travelling is involved by the user of the apparatus, either the charger must be carried around as well as the apparatus or the risk of discharging the batteries rendering the apparatus unuseable occurs. Furthermore, where the user of the apparatus travels between countries, a different charger is required on many occasions in the different countries since the electricity supply provided varies from country to country.

Another proposed solution has been to provide apparatus in which the nickel cadmium batteries are built into the apparatus and a charging arrangement has also been built in. This however has the disadvantage that if one wishes to change over from battery operated apparatus to rechargeable apparatus, then it is necessary to scrap the original apparatus and buy new ones. Thus perfectly good apparatus has to be scrapped for an apparatus which is considerably more expensive and which is totally vulnerable to any failure on any part of the cell and charging system. Furthermore, recharging can normally only be carried out with a specific mains supply.

The present invention seeks to provided a rechargeable battery in which some or all of the above disadvantages are obviated or reduced.

According to the invention, there is provided a rechargeable battery characterised in that it comprises a casing designed to fit into a space occupied at present by one or more dry batteries, the casing containing one or more nickel cadmium cells, a charging unit connected to the nickel cadmium cell or cells and means for connecting the charging unit to a supply of electricity.

Preferably the casing is divided into two compartments by a partition, one compartment housing the nickel cadmium cells and the other compartment housing the charging unit. The connecting means for the charging unit may comprise a connector socket opening to the exterior of the casing.

Preferably the charging circuit is of the constant current type and may be constructed to operate either on a.c or d.c.

The construction may also be such that the charger is able to work on virtually any known electricity supply, for example ranging from 12 volts d.c. up to 250 volts a.c.

Where the construction of the apparatus permits, the rechargeable batteries may be charged in situ without the necessity of removing them from the apparatus.

The invention will now be described in greater detail, by way of example, with reference to the drawings in which:

FIG. 1 is a diagrammatic view showing the layout of a rechargeable battery in accordance with the invention which is intended to replace 2 U2 type dry cells;

FIG. 2 is a diagrammatic view showing a suitable layout of a rechargeable battery in accordance with the invention intended to replace a type 996 lantern battery;

Figure 3:
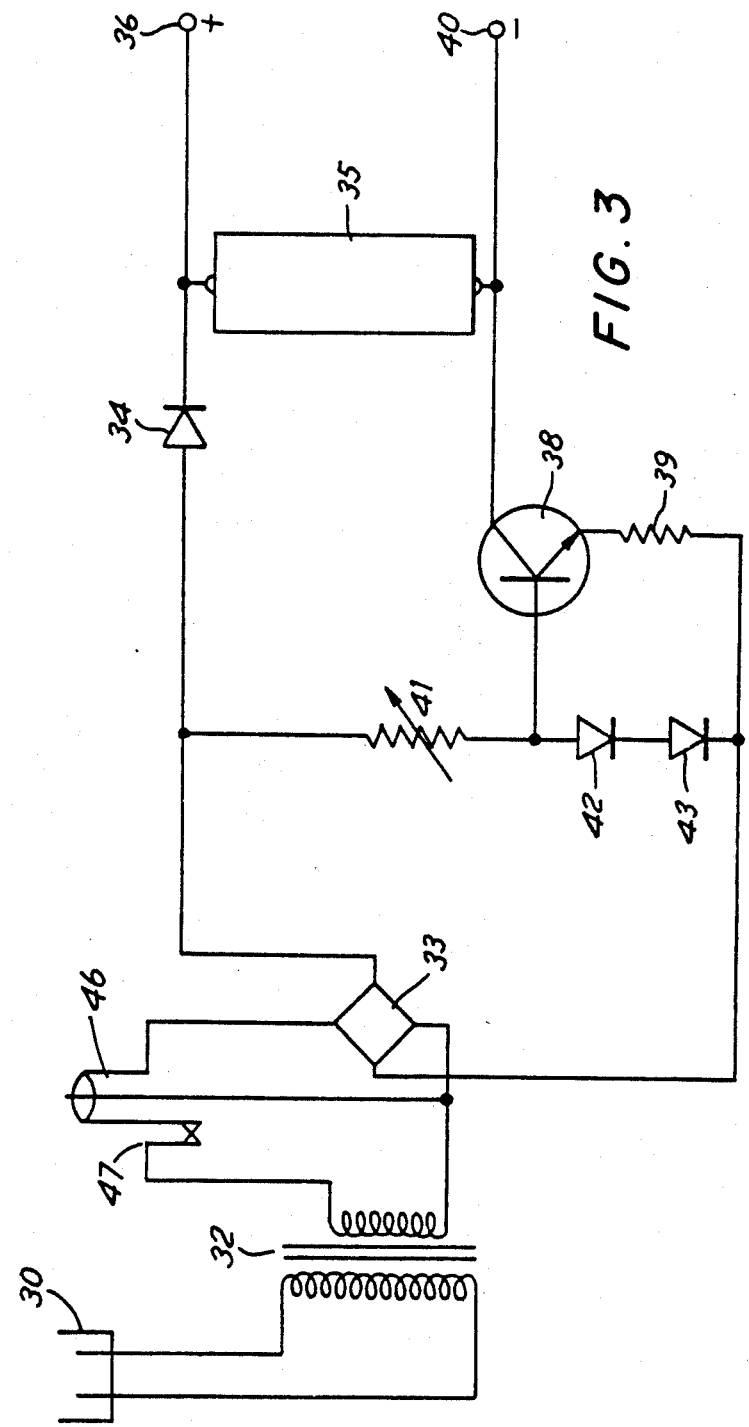
Figure 5:
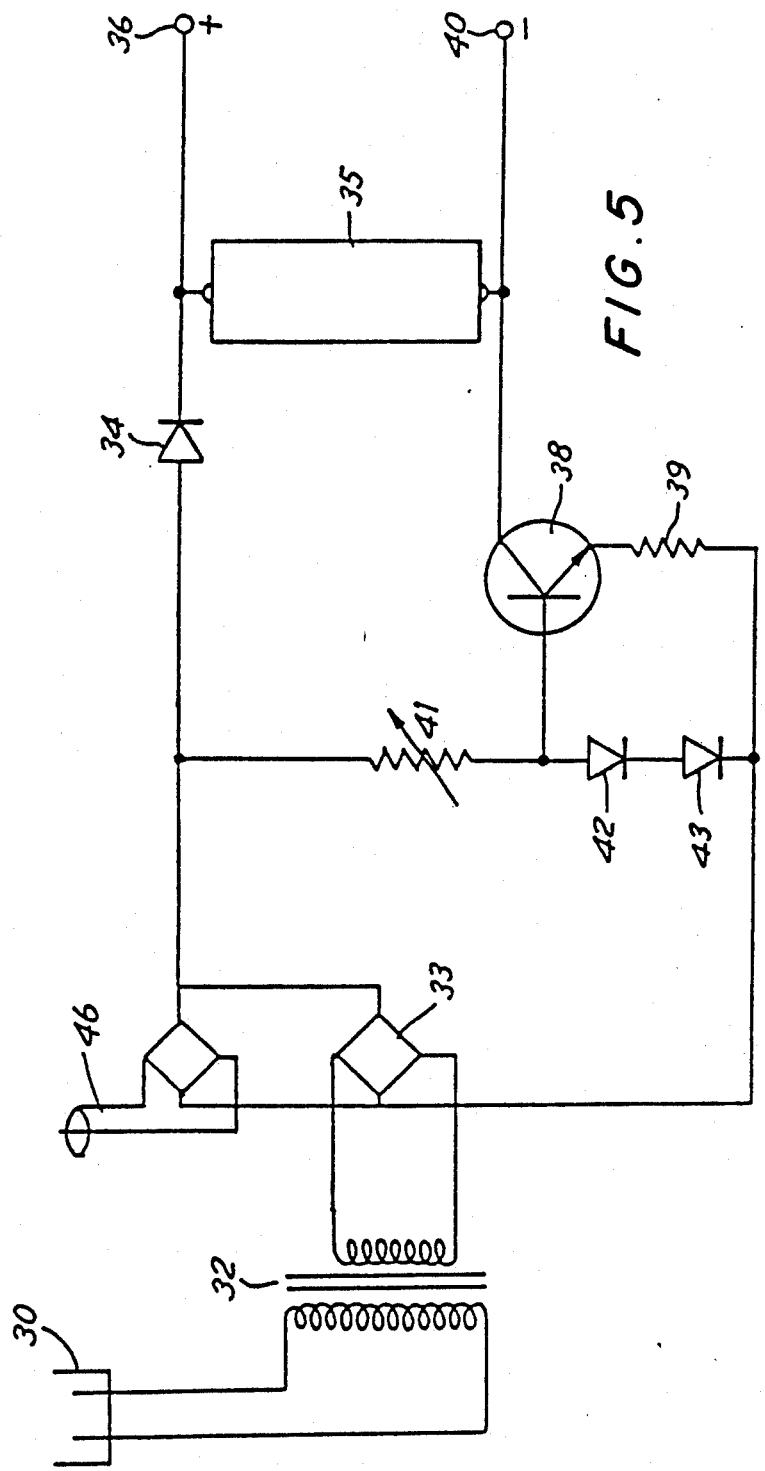

FIG. 3 is a circuit diagram showing a suitable form of charging circuit for use with the rechargeable batteries in accordance with the invention, FIG. 4 is a fragmentary view of one form of inductive coupling for connection of the charging circuit with the mains; and FIG. 5 is a circuit diagram of another embodiment showing a suitable form of charging circuit for use with rechargeable batteries in accordance with the invention.

Referring firstly to FIG. 1, the rechargeable battery comprises an exterior casing 1 of insulating material, for example, having the shape of two series connected U2 dry cells. To this end the casing has a positive bubble type terminal 2 at one end and a negative flat terminal 3 at the other end. The casing 1 is divided into two, by a partitioning wall 4. To one side of this partition wall (the left side of the drawing) two series connected nickel cadmium cells 6 are housed. Because of the increase in efficiency of the nickel cadmium cells, the two cells 6 will provide the effective equivalent of the dry batteries which they are replacing. This capability enables the nickel cadmium cells 6 to be located in only one half of the casing. The other half of the casing carries recharging system 8 for the nickel cadmium cell 6. As can be seen, the charger 8 is arranged on a circuit board 10 which lies longitudinally in the casing and has at one end a mains socket 11 extending to the exterior of the casing 1 in the middle area thereof. This socket is connectable to the mains supply by a suitable flex. The circuit board 10 also mounts all the components necessary for providing the charging operation, the circuit details of which will be described in connection with FIG. 3. In the charger illustrated diagrammatically, in FIG. 1, there can be seen a transformer 14 a regulating transistor 15 and other components.

FIG. 2 shows the invention as applied to a different type of battery, in this case a type 996 square section battery which is usually used as a lantern battery. In this case, four nickel cadmium cells 6 are used, only two of which are shown. The arrangement is generally similar to the battery shown in FIG. 1, comprising a casing 1 divided by a partition 4, the upper part housing the nickel cadmium cells 6 and the lower part housing the charging circuit 8.

In the present battery, both positive and negative terminals are in the form of spring contacts 20 and 21 respectively extending from the top 22 of the casing 1. As a result, the mains socket 11 is situated in the base 23 of the battery and is located in the middle of the circuit board 10.

FIG. 3 shows a suitable circuit for charging the nickel cadmium cells 6 of the batteries shown in FIGS. 1 and 2. In this respect, however, it will be noted that the circuit shown has an additional feature of being also chargeable from a d.c. source.

In the circuit shown, a mains input 30 is connected to the primary of a step down transformer 32 (shown in FIGS. 1 and 2 at 14). The secondary of this transformer 32 is connected to opposite corners of a bridge rectifier 33. The positive corner of the rectifier is connected through a diode 34 to the positive terminal of the nickel cadmium cells, one of which is shown at 35, this positive terminal also being connected to the positive terminal 36 of the battery. The negative corner of the bridge rectifier 33 is connected to the emitter of a control transistor 38 (shown in FIGS. 1 and 2 at 15) via an emitter resistor 39, the collector of the transistor 38 being connected to the negative terminal of the nickel cadmium cells 35 and thus on to the negative terminal 40 of the battery. The base of the transistor 38 is connected to the series connection of a pre-set variable resistor 41 and two diodes 42 and 43, which series connection is connected directly across the d.c. output corners of the bridge rectifier 33.

A d.c. input 46 is also provided for enabling charging from a d.c. source. This input is in the form of a coaxial jack socket with an associated switch 47 which isolates the secondary of the transformer from the d.c. source when the jack plug is in position. The input leads from the d.c. input are thus connected to the a.c. corners of the bridge rectifier, thus ensuring that, whichever way the d.c. input is poled, the nickel cadmium cells are still charged with the correct polarity.

It will be seen that with suitable values of the components, the circuit provides constant current charging and will enable the battery to be charged from almost any available supply of electricity. Thus, for example, 240 and 110 v a.c. mains can be used as well as a 12 volt d.c. source.

It is desirable if, during the conduction of the battery the cells and the charging apparatus are potted in a suitable resin for both security and stability.

FIG. 4 shows one example, schematically of the possibility of providing an inductive mains connection for the charging circuit instead of the necessity of providing a lead connection with this arrangement, the mains transformer 32 (FIG. 3) is split into two, only the secondary winding being present in the battery, the primary winding being separated from the secondary winding and being provided in a mains connection unit.

Thus, as shown in FIG. 4, a mains unit 51 is provided with a seating 52 which is surrounded by the primary winding 53 of the transformer. The seating 52 is shaped to receive the bottom end 54 of the battery housing 55. As seen a secondary winding 56 is located at this point of the battery housing together with the transformer core 57.

As an alternative to the arrangement shown, it is possible to provide an upstanding core of the mains unit which extends into a recess in the battery housing so as to locate the two halves of the transformer. In another example, two partial cores are provided, one for each winding and the two cores are merely juxtaposed for charging purposes.

As stated previously, the present rechargeable battery may take the place of a single battery where the apparatus uses a single battery or may take up the area of two or more original dry batteries in an arrangement which occupies the same shape as the original dry cells. Where the apparatus require a number of dry cells in certain circumstances, these may be replaced by an equal number of rechargeable nickel cadmium cells, each with their built-in charger as referred to above.

It will be appreciated that various modifications can be made to the above described embodiments without departing from the scope of the invention. For example, the invention may be used in any circumstances where one or more dry batteries are used provided that the dry battery or the combination of batteries provides sufficient room for housing the nickel cadmium cells and the charging apparatus. While it may be usual to remove the batteries for recharging, where the apparatus in which they are used permits, they may be charged in situ without harming the apparatus.

An automatic circuit breaker would be provided to guard against overloads. This could operate on a thermal basis if required. So as to avoid the necessity of manual resetting, the breaker could be constructed to reset once the overload condition is removed.

The switch contact 47 of the charging unit can be omitted, thus cutting out all mechanical moving parts. In this case (FIG. 5) two bridge rectifiers would be provided, connected in parallel, the low voltage input being connected, for example to the a.c. input of the second bridge rectifier. In this way it can be ensured that the load is automatically isolated.

The exact charging circuit can of course be varied as circumstances dictate, there being a number of possible variations in known charging circuits which could be applied here. The location of the various parts of the rechargeable battery can be varied in respect to the casing and casing of any desired shape may be used.

I claim:

1. A rechargeable electric battery comprising a casing with external terminals of standard dry-battery dimensions, one or more nickel-cadmium cells positioned within said casing and a constant-current charging unit positioned within said casing and connected to the cell or cells, said constant-current charging unit comprising a first terminal means for a.c. external supply, a step-down transformer having primary and secondary windings, said primary winding connected to said first terminal means, a second terminal means for d.c. external supply, a first bridge rectifier, said secondary winding and second terminal means being connected to said rectifier, disconnecting means interconnecting said second terminal means and said secondary winding for disconnecting the said first terminal means when said second terminal means is used and a feedback circuit to maintain constant current charging.

2. The battery as claimed in claim 1, wherein said casing has a partition dividing said casing into two compartments, one compartment housing the nickel cadmium cells and the other compartment housing the charging unit.

3. The battery as claimed in claim 1, wherein said second terminal means comprises a jack and said disconnecting means is a cut off switch.

4. The battery as claimed in claim 2, wherein said second terminal means comprises a jack and said disconnecting means is a cut off switch.

5. The battery as claimed in claim 1, wherein the feed-back circuit comprises a transistor, a preset variable resistor and two diodes, said transistor having a collector-emitter path connecting a negative pole of said first bridge rectifier and a negative terminal of the nickel cadmium cell or cells, said transistor having a base connected to a series connection of said preset variable resistor and said two diodes between said resistor and said diodes, the series connection being connected directly across the d.c. output of said first bridge rectifier.

6. The battery as claimed in claim 2, wherein the feed-back circuit comprises a transistor, a preset variable resistor and two diodes, said transistor having a collector-emitter path connecting a negative pole of said first bridge rectifier and a negative terminal of the nickel cadmium cell or cells, said transistor having a base connected to a series connection of said preset variable resistor and said two diodes between said resistor and said diodes, the series connection being connected directly across the d.c. output of said first bridge rectifier.

7. The battery as claimed in claim 1, wherein the feed-back circuit comprises a transistor, a preset variable resistor and two diodes, said transistor having a collector-emitter path connecting a negative pole of said first bridge rectifier and a negative terminal of the nickel cadmium cell or cells, said transistor having a base connected to a series connection of said preset variable resistor and said two diodes between said resistor and said diodes, the series connection being connected directly across the d.c. output of said first bridge rectifier.

8. The battery as claimed in claim 2, wherein the feed-back circuit comprises a transistor, a preset variable resistor and two diodes, said transistor having a collector-emitter path connecting a negative pole of said first bridge rectifier and a negative terminal of the nickel cadmium cell or cells, said transistor having a base connected to a series connection of said preset variable resistor and said two diodes between said resistor and said diodes, the series connection being connected directly across the d.c. output of said first bridge rectifier.

9. The battery as claimed in claim 3, wherein the feed-back circuit comprises a transistor, a preset variable resistor and two diodes, said transistor having a collector-emitter path connecting a negative pole of said first bridge rectifier and a negative terminal of the nickel cadmium cell or cells, said transistor having a base connected to a series connection of said preset variable resistor and said two diodes between said resistor and said diodes, the series connection being connected directly across the d.c. output of said first bridge rectifier.

10. The battery as claimed in claim 4, wherein the feed-back circuit comprises a transistor, a preset variable resistor and two diodes, said transistor having a collector-emitter path connecting a negative pole of said first bridge rectifier and a negative terminal of the nickel cadmium cell or cells, said transistor having a base connected to a series connection of said preset variable resistor and said two diodes between said resistor and said diodes, the series connection being connected directly across the d.c. output of said first bridge rectifier.

11. A battery as claimed in claim 1, wherein the contents of the casing are potted in resin.

12. A rechargeable electric battery comprising a casing with external terminals of standard dry-battery dimensions, one or more nickel-cadmium cells positioned within said casing and a constant-current charging unit positioned within said casing and connected to the cell or cells, said constant-current charging unit comprising a first terminal means for a.c. external supply, a step-down transformer having primary and secondary windings, said primary winding connected to said first terminal means, a second terminal means for d.c. external supply, a first bridge rectifier, said secondary winding being connected to said first rectifier, a second bridge rectifier, said first and second bridge rectifiers having d.c. outputs in parallel, an a.c. input of said first bridge rectifier being connected to said secondary winding of said step-down transformer, and an a.c. input of said second bridge rectifier being connected to said second terminal means, and a feedback circuit to maintain constant current charging.

* * * * *